J. W. COTTON.
FISH AND RAT TRAP.
APPLICATION FILED MAY 5, 1916.

1,191,124.

Patented July 11, 1916.

Inventor
J. W. Cotton

By T. K. Bryant
Attorney

UNITED STATES PATENT OFFICE.

JOHN W. COTTON, OF MAHL, TEXAS, ASSIGNOR OF ONE-HALF TO THOMAS J. TATOM, OF MAHL, TEXAS.

FISH AND RAT TRAP.

1,191,124.  Specification of Letters Patent.  Patented July 11, 1916.

Application filed May 5, 1916.  Serial No. 95,620.

*To all whom it may concern:*

Be it known that JOHN W. COTTON, a citizen of the United States of America, residing at Mahl, in the county of Nacogdoches and State of Texas, has invented certain new and useful Improvements in Fish and Rat Traps, of which the following is a specification.

This invention relates to new and useful improvements in fish and rat traps.

The primary object of the invention is the provision of a trap primarily designed for catching fish and being easily sprung although the trap is capable of catching bait robbers, such as rats which in some localities are a great nuisance to the fishermen.

A further object of the device is the provision of a fish trap positionable at any desired point in the water and having a sensitive trigger release mechanism for the operating spring adapted to be tripped in the event of only slight nibbles upon the bait arranged adjacent the hook jaws with which the device is provided.

A still further object of the invention is the provision of a fish trap that is easy and inexpensive to manufacture and which is designed to spear or impale any fish or small animal that may nibble or bite the bait arranged adjacent thereto.

With these general objects in view and others that will appear as the nature of the invention is better understood, the same consists in the novel combination and arrangement of parts hereinafter fully described, illustrated in the accompanying drawings and then claimed.

Figure 1:
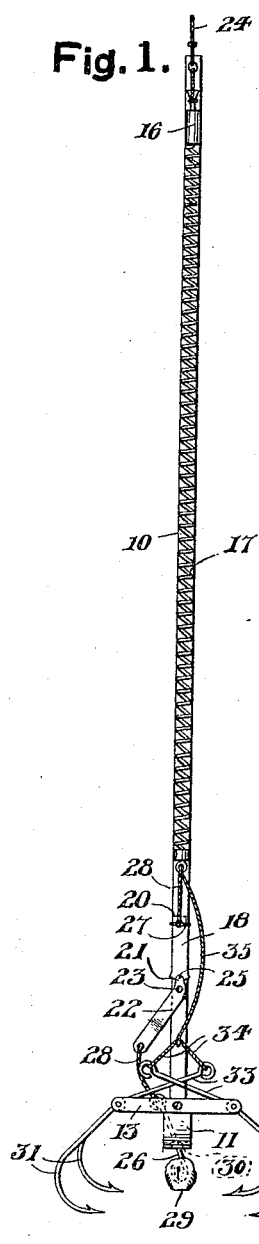
Figure 2:
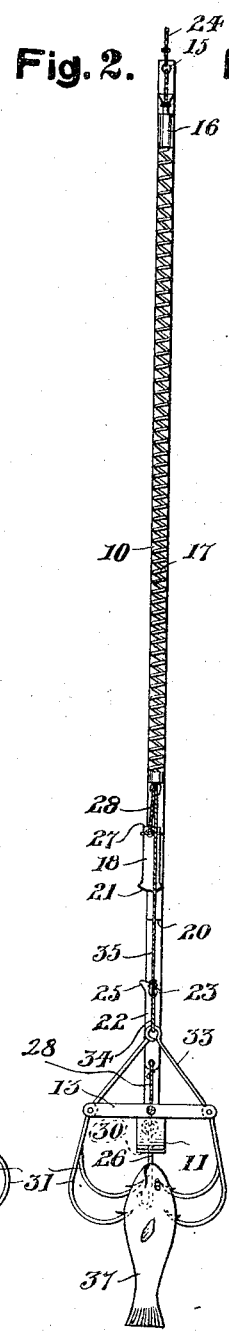
Figure 3:
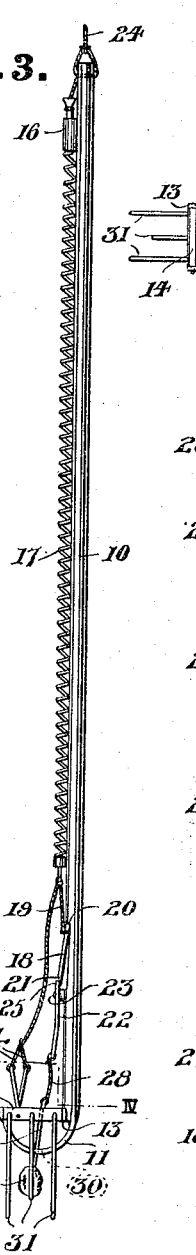
Figure 4:
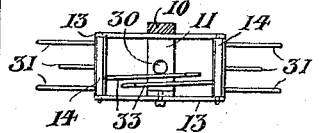
Figure 5:
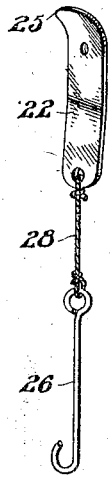
Figure 6:
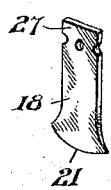

In the drawings forming a part of this application and in which like designating characters refer to corresponding parts throughout the several views:—Figure 1 is a front elevation of the device in its set or partially set position. Fig. 2 is a similar view thereof in its sprung fish impaling position. Fig. 3 is a side view of the device operatively set for use. Fig. 4 is a transverse sectional view taken upon line IV—IV of Fig. 3, with the bait member and operating cords removed. Fig. 5 is a perspective view of the trigger and bait connections, and Fig. 6 is a perspective view of the trip plate detached.

It will be understood that the present trap is designed to be suspended within the water for catching fish or when desired the same may be employed around fish nets or set lines for exterminating bait robbers, such as rats and other small animals.

The device includes a main shaft 10 formed of metal and having a curved lower end or arm 11 provided with a rectangular frame 13 rigidly mounted thereon, the opposite ends 14 of the frame being cylindrical journals having bearings in the frame.

An eye 15 is arranged at the upper end of the shaft 10 by means of which the device may be suspended by a rope or cord 24, while a connecting link 16 arranged at the said end of the shaft constitutes an anchor for one end of the operating spring 17 of the trap.

A hatchet-shaped trip or trigger plate 18 is secured by means of a loop 19 to the lower end of the spring 17, one end of said plate being adapted for engagement with a shoulder 20 upon the shaft 10 upon the same side thereof as the aforementioned spring 17, the said plate having a beveled curved edge 21 at its free end, it being understood that upon drawing down the spring 17 by means of the plate 18 the spring is forcibly extended and retained in that position by means of the trigger 22 when the trap is set, said trigger being pivoted to the shaft at 23, as best illustrated in Fig. 1 of the drawings.

A laterally projecting pointed end 25 of the said trigger is positioned overlying the trip plate end 21, while the opposite squared free end 27 of the trigger plate 18 is adapted to seat upon the shoulder 20 when the plate is arranged upon the shaft 10 with the trap in its set arrangement. The end of the trigger 22 lying opposite the plate engaging end 25 thereof is provided with a bait line 28 depending therefrom and arranged with a hook 26 to receive a piece of bait 29 upon its free end, the said bait being positioned beneath the frame 13 with the hooks 26 extending through a perforation 30 of the lower shaft end 11.

Catching devices are carried by the frame 13 and operatively attached to the lower end of the spring 17 and consist of hooks 31 secured to the journals 14, the latter having angularly projecting shanks 33, it being noted that the said shanks are designed for operating the plurality of inwardly projecting catching hooks or prongs 31. A flexible connector 34 is attached between the inner ends of the shanks 33 while a line 35 is secured to the lower free end of the spring 17 and to the said connector 34 and extends above the frame 13. The shanks 33 lie inwardly of and in the same plane as the frame 13 when the trap is set.

With the device suspended in the water by means of the rope 24 with the shaft 10 substantially upright, the spring 17 is extended with the trip plate 18 arranged tensioned against the shoulder 20 with its edge 21 beneath the trigger end 25 and the bait 29 positioned beneath the frame 13 and between the spaced hooks 33, it being understood that the catching members 31 when outstretched are substantially balanced upon the journals 14 when the connector 34 and the line 35 are in their slackened positions when the trap is set. A slight nibble upon the bait 29, such as by a fish 37, agitates the line 28 pulling the same downwardly and shifts the trigger 22 upon its pivot 23, which consequent movement of the trigger end 25 slightly laterally will disengage the end 25 from the plate end 21 thus releasing the spring 17. The contraction of the spring 17 gives a sudden impulse to the line 35 and the connector 34, thus elevating the inner end of the shanks 33 above the frame 13 and bringing the prongs 33 downwardly toward each other catching and impaling the fish 37 thereon, as illustrated in Fig. 2 of the drawings.

It will thus be seen that an inexpensive fish trap is arranged which may be easily set and which is sprung at any slight nibble or bite upon the bait arranged adjacent the catching prong.

What is claimed as new is:—

1. A trap comprising a shaft, a curved arm at one end thereof having a perforation therethrough, an operating spring having one end attached to the opposite end of the said shaft, a rectangular frame carried by the said arm in a plane perpendicular to the said shaft, said shaft having a lateral shoulder, a pivoted trigger upon the shaft adjacent the said shoulder having an offset pointed end, a trip plate having one end attached to the other end of the said spring and seated against the said shoulder when the spring is expanded with the trap in its set arrangement with the pointed end of said trigger positioned overlying the said opposite end of said plate, a line carried by said trigger, a hook upon said line depending through said arm perforation, bait attached to the said hook beneath the said frame, fish engaging members trunnioned at the opposite ends of the said frame and flexible operative connectors between the said spring and engaging members.

2. A trap comprising a shaft having a curved terminal lower end forming an arm and a suspending eye at its opposite end, a shoulder formed upon said shaft at the same side thereof as the said arm, an operating spring attached at one end to the said eye, a trip plate flexibly attached to the other end of said spring, the said shoulder being adapted for the abutting reception of said plate when the spring is extended, a bait carrying trigger pivoted to said shaft between said shoulder and arm in tripping engagement with said plate when the trap is in its set arrangement, trunnioned pronged catching members supported by the said arm and a connector between the said spring and catching members in slackened arrangement when the trap is set.

In testimony whereof I affix my signature.

JOHN W. COTTON.

Copies of this patent may be obtained for five cents each, by addressing the "Commissioner of Patents, Washington, D. C."